United States Patent Office 2,965,518
Patented Dec. 20, 1960

2,965,518

PROCESS FOR SIZING

Harry Meisel, Englewood, N.J., assignor to Corn Products Company, a corporation of Delaware No Drawing. Filed Oct. 8, 1958, Ser. No. 765,937

2 Claims. (Cl. 117—139.5)

This invention relates to a new and novel method of sizing substances, e.g., cellulosic substances, with starch derivatives and has particular application in the textile and paper fields.

Starch, either raw or modified, has long been used in sizing textiles in various stages of their manufacture as well as in sizing of garments in home and commercial laundries. Starch is also used in sizing paper, e.g., in the beater and at the head box before the formation of the sheet. After the sheet is formed, it is sized with starch by the practice of tub sizing, the sheet being the counterpart of the fabric in textile sizing. Starch is also used in clay coating of paper, in laminating and corrugating adhesives, and the like.

In virtually all of the aforementioned applications, it is customary to use the starch in gelatinized (paste) form. A paste is prepared either by cooking raw or modified starch in water or by dispersing a pregelatinized starch in cold or warm water. Then the material to be sized is dipped into, or passed through, or added to the paste which operation leaves a film of starch paste on the material. Subsequent drying stiffens the film on the material.

Cold water starching of garments consists in dipping the garment into a cold water slurry of ungelatinized starch and ironing the garment in the presence of sufficient moisture to gelatinize the starch.

In these applications several problems are involved. For example, not only is there the problem of obtaining a uniform film or distribution of the starch on the material being sized, but also the problem of getting the proper amount or degree of sizing. These difficulties are probably due to the following reasons. Cellulosic materials, such as textiles, paper pulp, paper, etc., carry an anionic charge. Cooked starches used in sizing baths or uncooked starches used in dipping baths have heretofore been non-ionic in nature, or charged similarly to the cellulosic materials. Natural starches in their unmodified state carry substantially no charge. Oxidized starches and most starch esters are anionic in behavior.

Because of the charge relationships, a contact of cellulosic material in a solution or cooked paste or suspension of starch could result only in a non-substantive wetting of fiber or fabric, for example, or physical entrapment of starch granules, both of which results may be non-uniform due to non-homogeneity of paste, folds in garments, etc. The solution or liquid passing through the material, or remaining in the sizing vessel is essentially of the same constitution as that picked up by the cellulosic substance. The fiber, sheet or fabric, for example, would remove basically the same ratio of starch solids to water, as in the original starch to water composition, leaving a lesser amount of total liquid but of unchanged water to starch composition.

As a result of the above described characteristics of cellulosic materials and starches, there cannot be a quantitative use of the starch and much of it eventually finds its way, in commercial operations, into the waste discharged into nearby streams. This represents an economic loss and also creates a serious sewage disposal problem, particularly with paper mills, in view of the large volumes of water used in their processes.

I have discovered that I can overcome the above difficulties and, at the same time, contribute additional advantages by sizing cellulosic substances, e.g., textiles, paper, with various carbohydrate materials having specific characteristics. These carbohydrate materials comprise starches which have been treated to give them a positive charge. By the use of a carbohydrate material which is cationic in nature, and thus charged oppositely to the cellulose, these relationships between the negatively charged fibers, the positive carbohydrate material, and the aqueous medium are changed. The starch is picked up aliquot-wise with the aqueous medium. Products which are particularly suitable for purposes of my invention include cationic starch imino disubstituted carbamates in granule form made by reacting disubstituted cyanamides with starch, as illustrated hereinafter. These starches may be represented by the formula

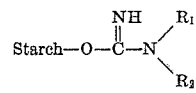

wherein $R_1$ and $R_2$ may be from the group consisting of alkyl, substituted alkyl, alkene, aryl and aralkyl. No claim is made herein to this method of producing such starch derivative, this being claimed in copending application Serial No. 621,990, filed November 14, 1956, now Patent No. 2,883,887.

The startling discovery concerning this particular cationic starch as a sizing agent is that it may be used for sizing purposes without pasting it and that it can be distributed uniformly on the material to be sized. Moreover, when used as a laundry size, the heat of the iron destroys at least 90 percent of the positive charge, thus making it easy to wash out during laundering and preventing at attraction of soil already washed out.

To carry out the invention, the simplest method is to slurry the cationic starch in granule form in cold water and pass the material to be sized through the slurry or add the slurry to the material to be sized, e.g., to the beater for beater sizing. The starch granules attach or anchor themselves uniformly to the cellulosic fibers by virute of their opposite charges and subsequent gelatinization and drying in situ provides the cementing bonds between the cellulosic fibers. Certain synthetic fibers, e.g., acetate, rayon may be sized similarly.

The invention will be further illustrated by the following examples which are intended as typical in informative only and in no way limiting the invention.

EXAMPLE I

This example illustrates the preparation of starch imino diallylcarbamate.

One-tenth mole (12.3 g.) of diallylcyanamide was added to a starch slurry consisting of one mole of starch, 0.14 mole of sodium sulfate and 0.1 mole of NaOH in 270 ml. of water. The mixture was stirred 18 hours at 50° C. in a closed reaction vessel. The reaction product was then neutralized to pH 6.5 with 0.12 moles of HCl, filtered and the filter cake washed first with one liter of water then with 500 ml. of methanol to eliminate unreacted diallyl-cyanamide. After air-drying the product analyzed 0.5 percent nitrogen by Kjeldahl nitrogen analysis, corresponding to a D.S. of 0.03.

EXAMPLE II

Cationic starch prepared in accordance with Example I was tested for sizing properties. Ninety-one grams, dry basis, of the cationic starch was agitated in 15 gallons of water at 80° F. for 15 seconds. Four pounds of cotton cloth was added to the slurry and agitated therein for 30 seconds. The cloth was removed and hand squeezed and ironed. The results are shown in Table I.

*Table I*

| | D.S. | Percent Starch Product Removed From Dispersion By Cloth | General Ironing Characteristics | Relative Stiffness [a] |
|---|---|---|---|---|
| Cationic Starch | 0.03 | 58 | Poor [b] | 13 |

[a] Commercially available liquid starch 1:1 dilution equals 10.
[b] The sizing characteristics of this cationic starch were so much greater than known starches that when used in the amount normally used in laundering the size was found to be too heavy. This is an advantage, not a detraction from the invention.

EXAMPLE III

Weighed fabric swatches were sized with uncooked dispersions of unmodified corn starch and cationic starch prepared in accordance with Example I. The swatches were damp dried under standard conditions, then ironed dry when the starches were gelatinized in situ. The amount of size picked up by each fabric was determined and the stiffness of each fabric was measured using a Peterson-Danzig Stiffness Tester [a]. The swatches were then washed under controlled conditions using a commercial detergent and water. After drying, the loss in weight of each swatch was determined as the amount of size removed on washing. A second set of the sized fabrics was washed under similar conditions but in the presence of a synthetic carbon soil. Reflectometer [b] readings were taken on these after drying. Swatches were also sized with a dispersion of cooked thick-boiling corn starch at various concentrations and measurements were made similar to those above.

The table below outlines the results obtained when swatches were compared to one another in the same relative stiffness range of from 70 to 80 units.

*Table II*

| Starch Product | Size Bath Conc. g./l. | Grams Size Picked Up By 8 Grams Cloth | Percent Size Removed on Washing | Percent Reflectance Of Swatch Washed in Presence Of Soil |
|---|---|---|---|---|
| Corn starch Gelatinized in situ | 20 | 0.28 | 32 | 87.5 |
| Cationic starch Gelatinized in situ | 5 | 0.27 | 28 | 81.7 |

The results show that the cationic starch has superior sizing capacity over corn starch, is unexpectedly more substantive, and is readily removed upon laundering the fabric.

This application is a continuation-in-part of application Serial No. 622,545, filed November 16, 1956, now abandoned.

I claim:

1. Process of sizing cellulosic substances which comprises contacting said substances with an aqueous slurry of a cationic starch imino disubstituted carbamate represented by the formula

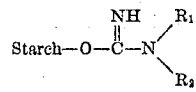

wherein $R_1$ and $R_2$ are a radical from the group consisting of alkyl, substituted alkyl, alkene, aryl and aralkyl.

2. Process of sizing cellulosic substances which comprises contacting said substances with an aqueous slurry of starch imino diallylcarbamate.

[a] Peterson, E. C., and Danzig, T., "Quantitative Method for Evaluating Stiffness," U.S. Dept. Agric., Techn. Bulletin No. 108, April 1929.
[b] Photovolt Corp., N.Y., Photovolt Reflection Meter Model No. 610 with search unit 610-D with green tristimulus filter.

References Cited in the file of this patent
UNITED STATES PATENTS

| 2,813,093 | Caldwell et al. | Nov. 12, 1957 |
| 2,876,217 | Paschall | Mar. 3, 1959 |